US012701335B2

(12) United States Patent
Jo et al.

(10) Patent No.: US 12,701,335 B2
(45) Date of Patent: Aug. 4, 2026

(54) ELECTRONIC DEVICE INCLUDING A CAMERA

(71) Applicant: SAMSUNG ELECTRONICS CO., LTD., Suwon-si (KR)

(72) Inventors: Hyeoncheol Jo, Suwon-si (KR); Inah Moon, Suwon-si (KR); Dongsoo Kim, Suwon-si (KR); Jaehyoung Park, Suwon-si (KR); Shuichi Shimokawa, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 126 days.

(21) Appl. No.: 18/377,118

(22) Filed: Oct. 5, 2023

(65) Prior Publication Data

US 2024/0121525 A1     Apr. 11, 2024

Related U.S. Application Data

(63) Continuation of application No. PCT/KR2023/015213, filed on Oct. 4, 2023.

(30) Foreign Application Priority Data

| | | |
|---|---|---|
| Oct. 5, 2022 | (KR) | ........................ 10-2022-0127289 |
| Dec. 20, 2022 | (KR) | ........................ 10-2022-0179437 |

(51) Int. Cl.
*H04N 25/57* (2023.01)
*H04N 23/51* (2023.01)
(Continued)

(52) U.S. Cl.
CPC ............. *H04N 25/57* (2023.01); *H04N 23/51* (2023.01); *H04N 23/665* (2023.01);
(Continued)

(58) Field of Classification Search
CPC ...... H04N 25/57; H04N 23/51; H04N 23/665; H04N 25/40; H04N 25/615; H04N 25/706;
(Continued)

(56) References Cited

U.S. PATENT DOCUMENTS

| | | | |
|---|---|---|---|
| 6,246,436 | B1 | 6/2001 | Lin et al. |
| 6,977,363 | B2 | 12/2005 | Kokubun |

(Continued)

FOREIGN PATENT DOCUMENTS

| | | |
|---|---|---|
| CN | 109151293 B | 10/2020 |
| CN | 113937119 A | 1/2022 |

(Continued)

OTHER PUBLICATIONS

International Search Report (PCT/ISA/210) issued by the International Searching Authority on Jan. 22, 2024 in International Application No. PCT/KR2023/015213.

(Continued)

*Primary Examiner* — Angel L Garces-Rivera
(74) *Attorney, Agent, or Firm* — Sughrue Mion, PLLC

(57) ABSTRACT

An electronic device may include an image sensor, a processor, and a memory. The image sensor may include at least one photo diode, a transfer gate connecting the at least one photo diode to a first node (FD1 node), a first capacitor connected to the first node and having first capacitance, a dynamic range gate (DRG) connected between the first node and a second node (FD2 node), a second capacitor connected to the second node and having second capacitance, and a micro controller unit. Other various embodiments identified through the specification are possible.

15 Claims, 8 Drawing Sheets

(51) Int. Cl.

| | |
|---|---|
| *H04N 23/60* | (2023.01) |
| *H04N 25/40* | (2023.01) |
| *H04N 25/615* | (2023.01) |
| *H04N 25/706* | (2023.01) |
| *H04N 25/772* | (2023.01) |

(52) U.S. Cl.
CPC ........... *H04N 25/40* (2023.01); *H04N 25/615* (2023.01); *H04N 25/706* (2023.01); *H04N 25/772* (2023.01)

(58) Field of Classification Search
CPC ............. H04N 25/772; H04N 23/6812; H04N 23/687; H04N 23/698; H04N 25/58; H04N 25/589; H04N 25/59; H04N 25/75; H04N 25/766; H04N 25/77; H04N 25/771; H04N 25/78
See application file for complete search history.

(56) References Cited

U.S. PATENT DOCUMENTS

| | | |
|---|---|---|
| 9,407,795 B2 | 8/2016 | Maes |
| 9,686,490 B2 | 6/2017 | Lund et al. |
| 10,136,084 B1 | 11/2018 | Solheim et al. |
| 10,498,972 B1 | 12/2019 | Chen |
| 10,498,991 B2 | 12/2019 | Van Der Tempel |
| 11,025,844 B2 | 6/2021 | Seo et al. |
| 11,343,449 B2 | 5/2022 | Paik et al. |
| 11,343,450 B1 | 5/2022 | Hasegawa |
| 11,343,459 B2 | 5/2022 | Jung et al. |
| 11,528,439 B2 | 12/2022 | Kim et al. |
| 11,689,827 B2 | 6/2023 | Jung et al. |

| | | | |
|---|---|---|---|
| 12,068,353 B2 * | 8/2024 | Stefanov | ............... H10F 39/802 |
| 12,126,910 B2 | 10/2024 | Kim et al. | |
| 2003/0146369 A1 | 8/2003 | Kokubun | |
| 2009/0321799 A1 | 12/2009 | Velichko et al. | |
| 2014/0362282 A1 * | 12/2014 | Romanenko | ......... H04N 23/741 |
| | | | 348/362 |
| 2015/0281612 A1 | 10/2015 | Lund et al. | |
| 2015/0319383 A1 | 11/2015 | Maes | |
| 2017/0214878 A1 | 7/2017 | Van Der Tempel | |
| 2019/0355782 A1 | 11/2019 | Do et al. | |
| 2020/0260025 A1 | 8/2020 | Seo et al. | |
| 2021/0151485 A1 * | 5/2021 | Ma | ......................... H04N 25/46 |
| 2021/0250530 A1 | 8/2021 | Paik et al. | |
| 2021/0274121 A1 | 9/2021 | Kim et al. | |
| 2021/0278555 A1 | 9/2021 | De Roose et al. | |
| 2023/0113058 A1 | 4/2023 | Kim et al. | |
| 2025/0211878 A1 * | 6/2025 | Yanagisawa | ......... H03M 1/186 |

FOREIGN PATENT DOCUMENTS

| | | | |
|---|---|---|---|
| JP | 2011-250039 | A | 12/2011 |
| JP | 2017-523688 | A | 8/2017 |
| JP | 2020-505855 | A | 2/2020 |
| KR | 10-2003-0067490 | A | 8/2003 |
| KR | 10-2014-0065104 | A | 5/2014 |
| KR | 10-2020-0098764 | A | 8/2020 |
| KR | 10-2021-0102517 | A | 8/2021 |
| KR | 10-2021-0156458 | A | 12/2021 |
| WO | 2022/203447 | A1 | 9/2022 |

OTHER PUBLICATIONS

Communication dated Aug. 28, 2025, issued by European Patent Office in European Patent Application No. 23875194.5.

* cited by examiner

ELECTRONIC DEVICE INCLUDING A CAMERA

CROSS-REFERENCE TO RELATED APPLICATIONS

This application is continuation of International Application No. PCT/KR2023/015213, filed on Oct. 4, 2023, which is based on and claims priority to Korean Patent Application No. 10-2022-0127289, filed on Oct. 5, 2022, and Korean Patent Application No. 10-2022-0179437, filed on Dec. 20, 2022, in the Korean Intellectual Property Office, the disclosures of which are incorporated by reference herein in their entireties.

BACKGROUND

1. Field

The disclosure is related to an electronic device including a camera.

2. Description of Related Art

An electronic device (e.g., a smartphone, a tablet PC, or the like) may include a camera module (e.g., a camera, a camera device, or an imaging device). The electronic device may use the camera module to capture a picture or a video. The electronic device may provide image conversion effects according to various shooting modes of the camera module. A user may select a shooting mode according to a shooting environment, and may shoot an image to which various image effects are applied.

Among image processing effects provided by the electronic device, a high dynamic range (HDR) effect refers to a technology that expands a dynamic range (DR) for dark and bright parts. Through the HDR, expressiveness of dark parts of an image may be improved, and the ration of bright parts of the image may be suppressed.

An HDR image may be generated by using a multi-frame high dynamic range (MF HDR) technology. The MF HDR technology refers to a technology that expands DR by obtaining and synthesizing a plurality of images corresponding to different exposure times. The electronic device may obtain an HDR image based on a short-exposure image for a bright part and a long-exposure image for a dark part.

When an electronic device applies HDR, the electronic device may perform HDR synthesis by using a plurality of images with different exposures. In this case, a ghost phenomenon may occur due to movement of the object or shaking of a user's hand. Alternatively, the electronic device may perform the HDR synthesis by using images obtained by varying exposure for each part in one image. In this case, noise may increase due to resolution reduction and shortened exposure.

SUMMARY

According to an embodiment, an electronic device may include an image sensor, a processor, and a memory. The image sensor may include at least one photo diode, a transfer gate connecting the at least one photo diode to a first node (FD1 node), a first capacitor connected to the first node and having first capacitance, a dynamic range gate (DRG) connected between the first node and a second node (FD2 node), a second capacitor connected to the second node and having second capacitance, and a micro controller unit configured to obtain first analog data at the first node, by deactivating the DRG, and obtain second analog data at the first node and the second node, by activating the DRG. The processor may generate a high dynamic range (HDR) image based on the first analog data and the second analog data.

According to an embodiment, an electronic device may include a camera module, a processor, and a memory. The camera module may include a lens, an image sensor, and an image signal processor. The image sensor may include at least one photo diode, a transfer gate connecting the at least one photo diode to a first node (FD1 node), a first capacitor connected to the first node and having first capacitance, a DRG connected between the first node and a second node (FD2 node), and a second capacitor connected to the second node and having second capacitance. The image signal processor may obtain first analog data at the first node, by deactivating the DRG, obtain second analog data at the first node and the second node, by activating the DRG, and generate a high dynamic range (HDR) image based on the first analog data and the second analog data.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Hereinafter, various embodiments of the disclosure will be described with reference to accompanying drawings. Accordingly, those of ordinary skill in the art will recognize that modification, equivalent, and/or alternative on the various embodiments described herein can be variously made without departing from the scope and spirit of the disclosure.

Figure 1:
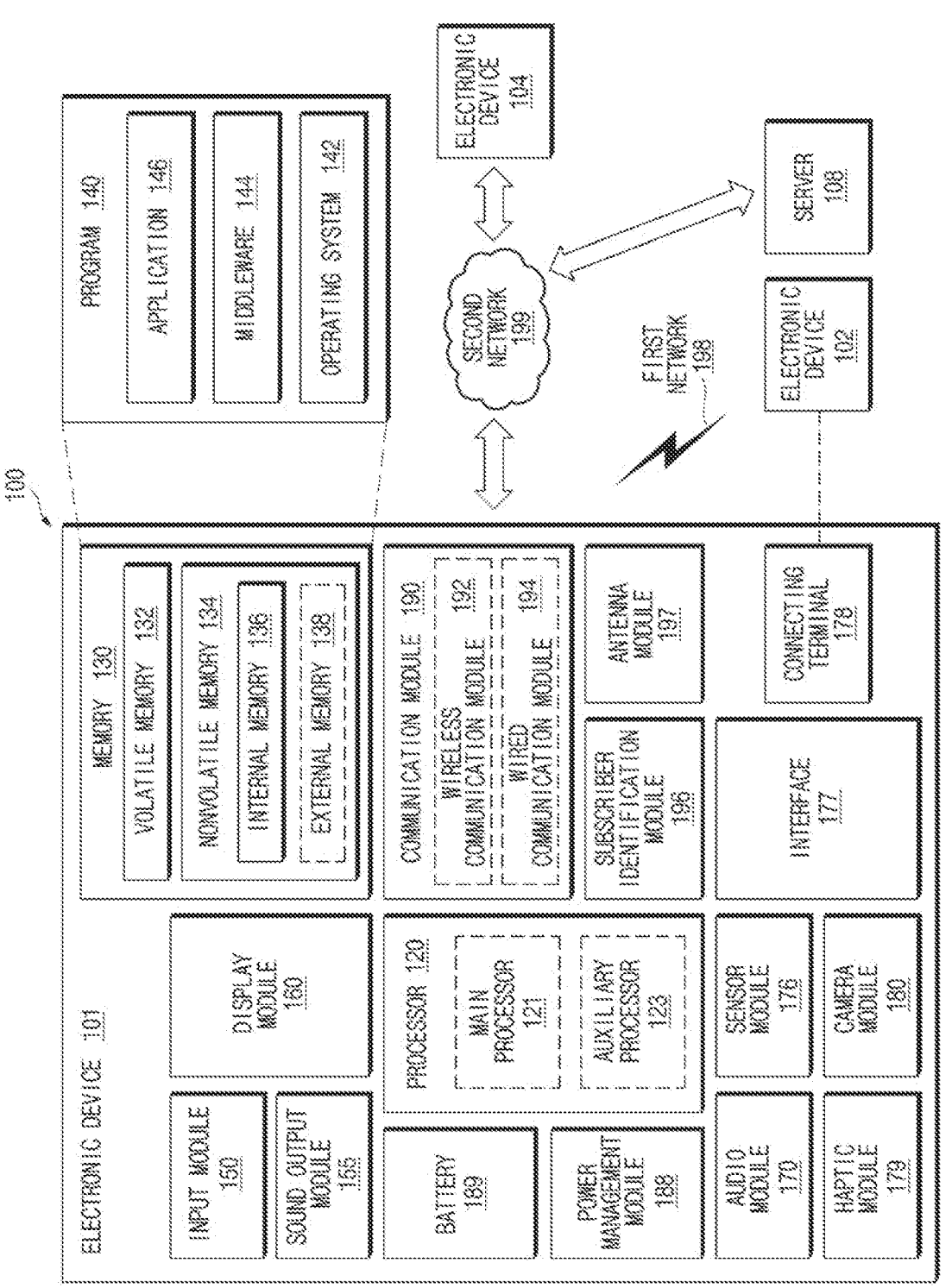
FIG. 1 is a block diagram of an electronic device in a network environment, according to an embodiment.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
FIG. 2 is a block diagram illustrating a camera module, according to an embodiment.
Figure 2:
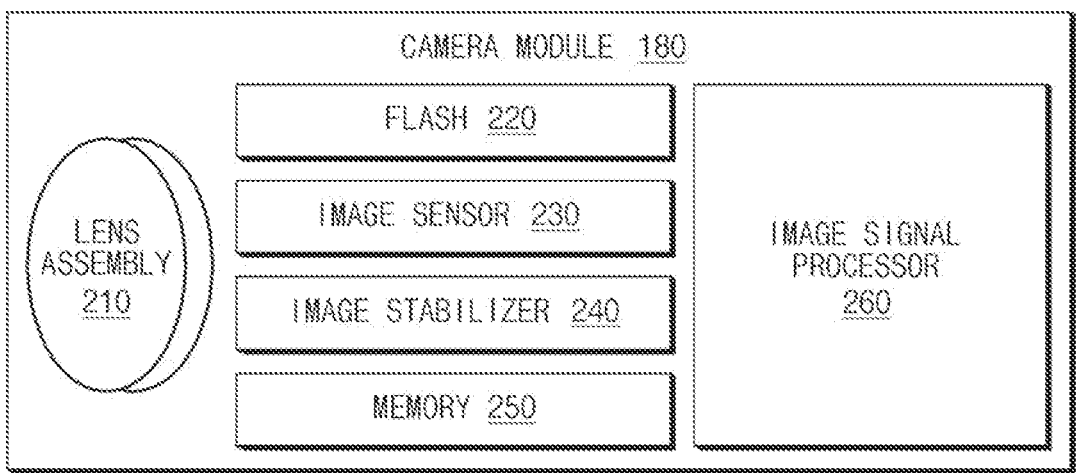

FIG. 2 is a block diagram 200 illustrating the camera module 180 according to various embodiments.

Referring to FIG. 2, the camera module 180 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display module 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display module 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display module 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

Figure 3:
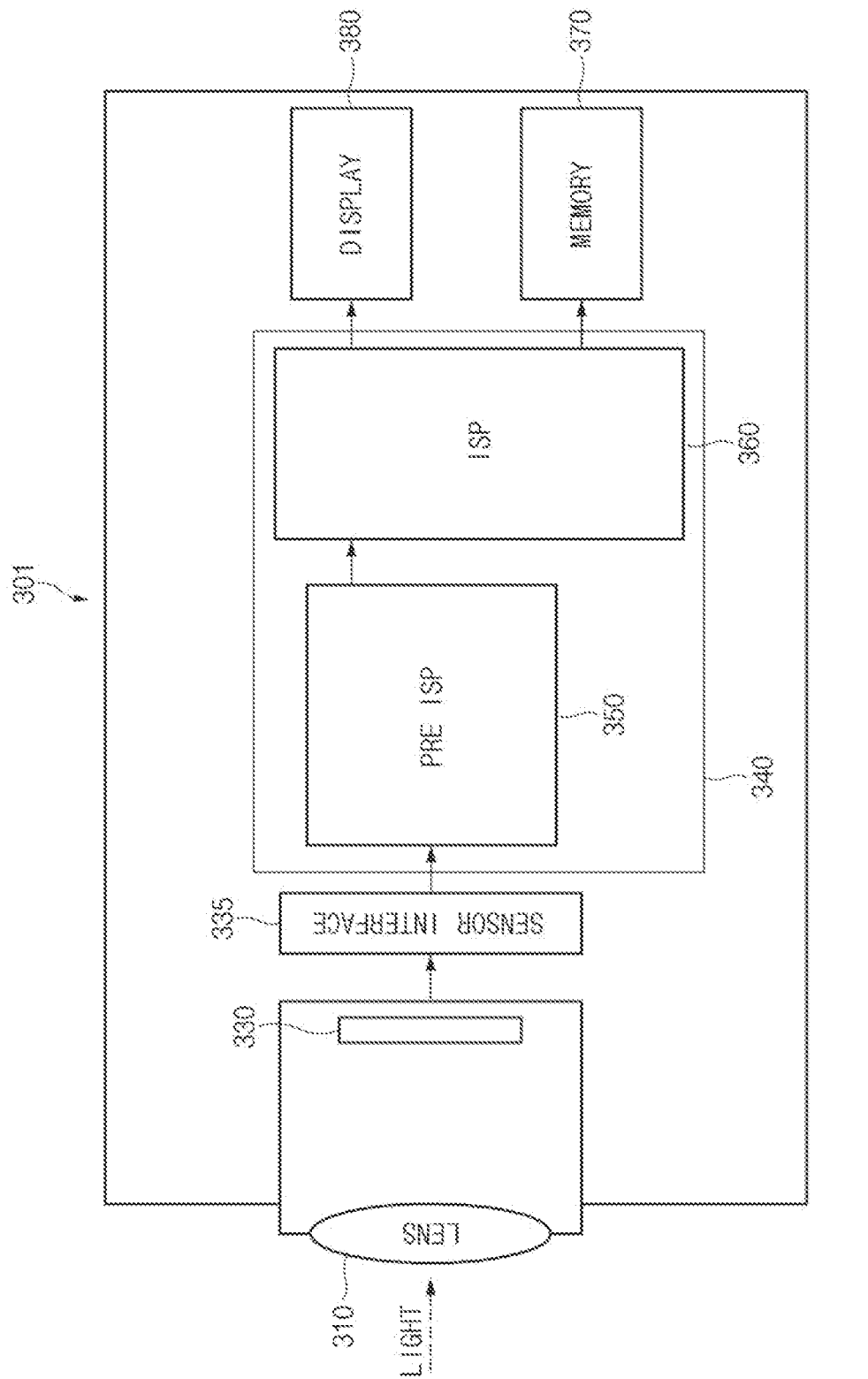
FIG. 3 is a block diagram of an electronic device, according to an embodiment.

FIG. 3 is a block diagram of an electronic device, according to various embodiments.

Referring to FIG. 3, an electronic device 301 (e.g., electronic device 101 in FIG. 1) may be a device that collects light reflected from an external subject to capture a picture or a video. The electronic device 301 may include a lens 310, an image sensor (or an imaging element unit) 330, a sensor interface 335, an image processor 340, a memory 370, and a display 380.

The lens 310 may collect light that reaches a device from a subject. An image may be formed on the image sensor 330 by the collected light.

The image sensor 330 may convert light into electronic image data by using a photoelectric conversion effect. The image data may be delivered to the image processor 340 through the sensor interface 335. The image sensor 330 may include a group of pixels arranged two-dimensionally and may convert light into electronic image data at each pixel. The image sensor 330 may read out the electronic image data according to the photoelectric conversion effect, which are recorded at each pixel.

According to an embodiment, the image sensor 330 may include a micro-lens array. The micro-lens array may be positioned to correspond to each pixel of the image sensor 330.

According to an embodiment, the image sensor 330 may include a separate calculation unit (e.g., a micro controller unit; MCU). Hereinafter, at least some operations of the image processor 340 may be performed by the calculation unit (or the micro controller unit) of the image sensor 330.

According to various embodiments, the image sensor 330 may adjust the amount (exposure amount) of light delivered to the image sensor 330 with an exposure time determined by the image processor 340.

The sensor interface 335 may perform an interface between the image sensor 330 and the image processor 340. According to an embodiment, the sensor interface 335 may be located in front of or behind a pre-processor 350 inside the image processor 340 depending on the configuration of the electronic device 301.

The image processor 340 may process image data collected by the image sensor 330 through various processes, and may store the processed image data in the memory 370 or output the processed image data to the display 380.

According to an embodiment, the image processor 340 may be a processor (e.g., the processor 120 of FIG. 1) inside the electronic device 301. According to another embodiment, the image processor 340 may be separate from a processor (e.g., the processor 120 of FIG. 1) inside the electronic device 301. At least part of functions performed by the image processor 340 may be performed by the processor 120 inside the electronic device 301.

In various embodiments, the image processor 340 may include the pre-processor 350 (e.g., a pre ISP) and a main processor 360 (e.g., an image signal processor (ISP)).

The pre-processor 350 (e.g., the pre ISP) may store an image (or an image frame) obtained through the image sensor 330. The pre-processor 350 may process or convert the image by loading the stored image.

The main processor 360 (e.g., an application processor (AP) or an ISP) may perform digital signal processing on an image signal processed through the pre-processor 350. The main processor 360 may generate an image signal by correcting or synthesizing signals received from the pre-processor 350. The main processor 360 may allow the display 350 to display the generated image signal. The main processor 360 may perform conversion such as amplification, conversion, and processing of an image data signal.

The memory 370 (e.g., the memory 130 in FIG. 1) may store a current image, information needed to control an imaging device, etc.

The display 380 (e.g., the display module 160 of FIG. 1) may output an image by using image data processed by the image processor 340.

Figure 4:
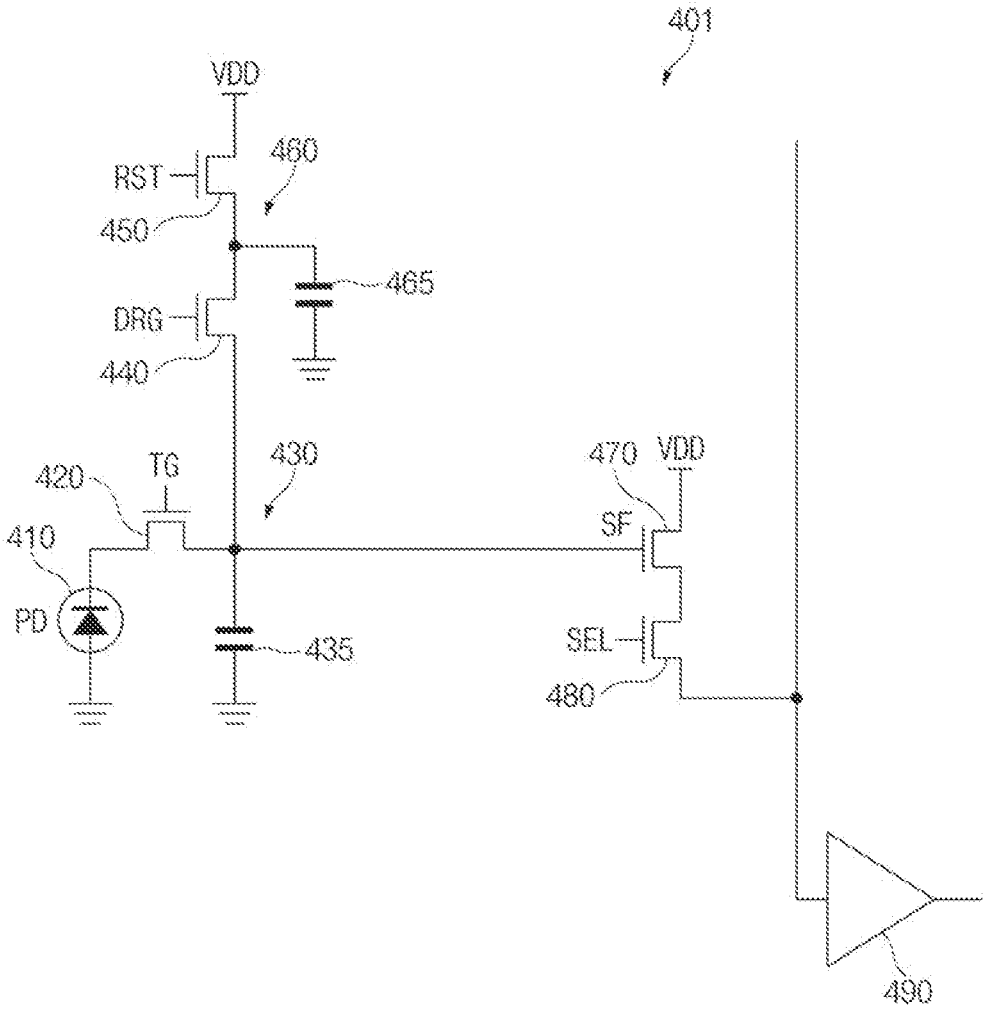
FIG. 4 is a circuit diagram of a unit pixel of an image sensor, according to an embodiment.

FIG. 4 is a circuit diagram of a unit pixel of an image sensor, according to an embodiment.

Referring to FIGS. 3 and 4, a unit pixel 401 may receive and convert light into an electrical signal. The plurality of unit pixels 401 may be included in the image sensor 330.

The unit pixel 401 may include a photo diode (hereinafter referred to as "PD") 410, a transfer gate (hereinafter referred to as "TG") 420, a first capacitor 435, a dynamic range gate (or a conversion switch) (hereinafter referred to as "DRG") (440), the second capacitor 465, a reset gate (or a reset switch)(hereinafter referred to as "RST") 450, a source follower (hereinafter referred to as "SF") 470, a row select (hereinafter referred to as "SEL") 480, and an analog-digital converter (hereinafter referred to as "ADC") 490.

During a specified exposure time, the PD 410 may generate charges by using light. The PD 410 may be connected to a first floating diffusion (FD) 430 through the TG 420. When the TG 420 is activated (alternatively, when the TG 420 is turned on), charges accumulated in the PD 410 may be charged in the first capacitor 435 connected to the first FD 430.

The first capacitor 435 may be connected between the first FD 430 and the ground. When the TG 420 is activated, the first capacitor 435 may primarily store charges delivered from the PD 410. According to an embodiment, the capacitance of the first capacitor 435 may be smaller than the capacitance of the second capacitor 465.

The DRG 440 may be connected between the first FD 430 and a second FD 460. The conversion gain of analog data may be adjusted depending on the on/off of the DRG 440.

For example, when the TG 420 is activated and the DRG 440 is inactivated (high conversion gain; hereinafter referred to as "HCG"), charges charged in the first capacitor 435 may not move to the second capacitor 465. In HCG, the charges charged in the first capacitor 435 may be read out through the SF 470 (hereinafter referred to as "first analog data").

For another example, when the TG 420 and the DRG 440 are activated (low conversion gain; hereinafter referred to as "LCG"), the first FD 430 and the second FD 460 may be connected to each other. In this case, charges remaining in the PD 410 or charges charged in the first capacitor 435 may move to the second capacitor 465. In LCG, charges charged in the first capacitor 435 and the second capacitor 465 may be read out through the SF 470 (hereinafter referred to as "second analog data").

The second capacitor 465 may be connected between the second FD 460 and the ground. When the TG 420 and the DRG 440 are activated (LCG), the second capacitor 465 may store charges remaining in the PD 410 or charges delivered from the first capacitor 435. According to an embodiment, the capacitance of the second capacitor 465 may be greater than the capacitance of the first capacitor 435 (e.g., 3 times).

The RST 450 may be connected between a power supply VDD and the second FD 460. When the RST 450 and the DRG 440 are activated, the first capacitor 435 and the second capacitor 465 may be reset to VDD.

According to an embodiment, in a state before the charges delivered through the PD 410 are stored in the first capacitor 435 and the second capacitor 465, the image sensor 330 may perform a correlated double sampling (CDS) operation to reduce noise. For example, the image sensor 330 may reset data accumulated in the first capacitor and the second capacitor by turning on the RST 450 and the DRG 440. The image sensor 330 may read out reset data remaining after the reset. The reset data may be data by charges remaining in the first capacitor or the second capacitor in a reset state, not charges charged through the PD 410. The image sensor 330 may obtain actual image data by removing (e.g., elimination using a subtractor) the reset data from the first analog data or the second analog data.

The SF 470 may be connected between the first FD 430 and the SEL 480. When the SEL 480 is activated, the SF 470 may deliver the first analog data or the second analog data to the ADC 490.

When the SEL 480 is activated, analog data may be converted into digital data. The image sensor 330 may activate the SEL 480 to output image data in a specific row.

The ADC 490 may generate the digital data by converting the analog data into a specified gain (or analog gain). In HCG, the ADC 490 may convert the first analog data into first digital data by using a saturation voltage corresponding to a relatively high first gain (e.g., ×4) (high slope gain (HSG)). Moreover, in LCG, the ADC 490 may convert the second analog data into second digital data by using a saturation voltage corresponding to a relatively low second gain (e.g., ×1) (low slope gain (LSG)).

According to an embodiment, the ADC 490 may be implemented as the plurality of ADCs 490. When the one ADC 490 is disposed, HSG and LSG may proceed in chronological order (time division). When the plurality of ADCs 490 are present, the plurality of ADCs 490 may operate with different gains, and the digital data may be generated quickly.

Hereinafter, a description will be given with respect to the case where a first gain is ×4 and a second gain is ×1. However, embodiments are not limited thereto. The first gain or the second gain may be adjusted or changed to the extent that is allowed by the ADC 490. For example, the first gain may be ×8, and the second gain may be ×0.5.

According to an embodiment, the image sensor 330 may obtain the first analog data by charging (HCG) the first capacitor 435 by one exposure. The image sensor 330 may generate the first digital data through the ADC 490 by applying the relatively high first gain (e.g., ×4) to the first analog data obtained in HCG. Afterward, the image sensor 330 may deliver charges remaining in the PD 410 or charges of the first capacitor 435 to the second capacitor 465 without additional exposure (LCG) and may obtain the second analog data. The image sensor 330 may generate the second digital data through the ADC 490 by applying a relatively low second gain (e.g., ×1) to the second analog data obtained in LCG.

The image sensor 330 (alternatively, the processor 120 or the image processor 340) may generate an HDR image based on the first digital data by HCG and HSG and the second digital data by LCG and LSG. In this case, an image with a high HDR ratio may be obtained, and noise may be improved.

FIG. 4 illustrates that the unit pixel 401 includes the one PD 410, but is not limited thereto. For example, the unit pixel 401 may include first to fourth PDs and first to fourth TGs. The first PD may be connected to the first FD through the first TG. The second PD may be connected to the first FD through the second TG. The third PD may be connected to the first FD through the third TG. The fourth PD may be connected to the first FD through the fourth TG. The image sensor 330 may simultaneously expose the first to fourth PDs once and may apply a dual conversion gain (DCG: HCG and LCG) and a dual slope gain (DSG; HSG and LSG).

Figure 5:
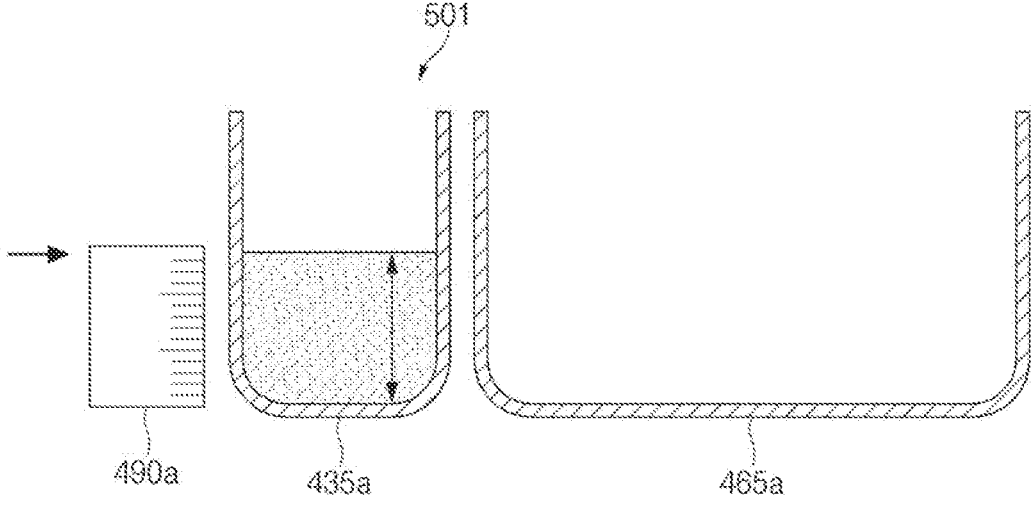
FIG. 5 illustrates an operation of an image sensor by high conversion gain (HCG) and high slope gain (HSG), according to an embodiment.
Figure 5:
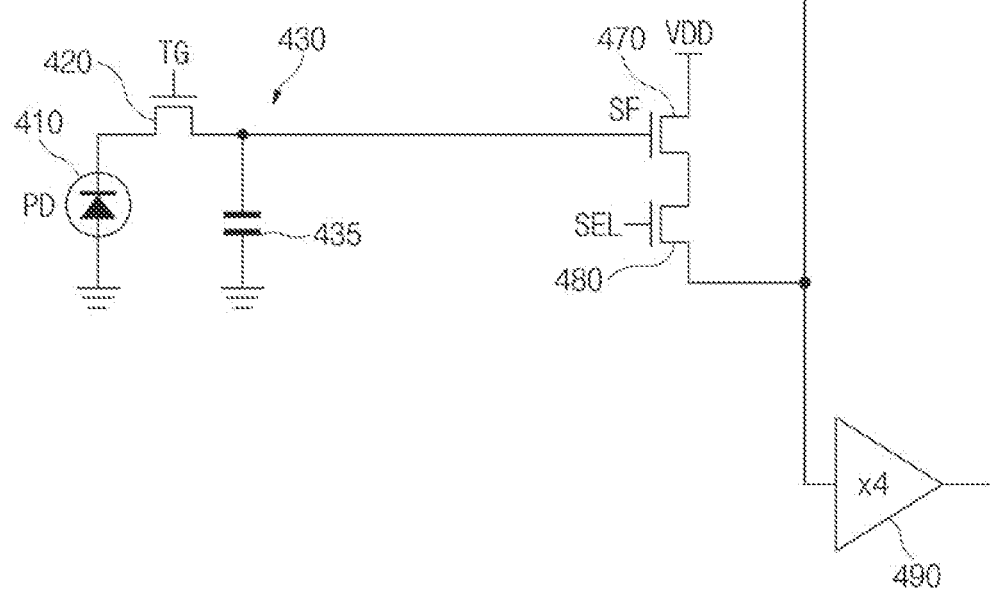

FIG. 5 illustrates an operation of an image sensor by HCG and HSG, according to an embodiment.

Referring to FIG. 5, the PD 410 may generate charges by using light during a specified exposure time. When the TG 420 is activated, charges accumulated in the PD 410 may be charged in the first capacitor 435 connected to the first FD 430. In HCG in which the DRG 440 is inactivated, charges stored in the first capacitor 435 may be maintained without moving to the second capacitor 465. In a tank model 501, a first tank 435a corresponding to the first capacitor 435 may contain water (corresponding to charges being charged), and a second tank 465a corresponding to the second capacitor 465 may contain no water.

According to an embodiment, charges (reset data) remaining after the reset, not charges delivered from the PD 410, may remain in the first capacitor 435. The reset data may be removed through a separate CDS operation (see FIG. 7).

While the ADC 490 converts first analog data obtained in HCG into first digital data, a saturation voltage may be adjusted (HSG) to correspond to a relatively high first gain (e.g., ×4). In the tank model 501, the first gain of the ADC 490 may correspond to a ruler 490a for measuring a water level in a tank. As the gain increases, a scale interval of the ruler for measuring the water level may be reduced. Accordingly, as the scale interval decreases, the height of water may be read out as a relatively large value. The first digital data generated through HCG and HSG may be data that is advantageous for representing a dark part because an input conversion noise value (=noise/gain) is lowered.

Figure 6:
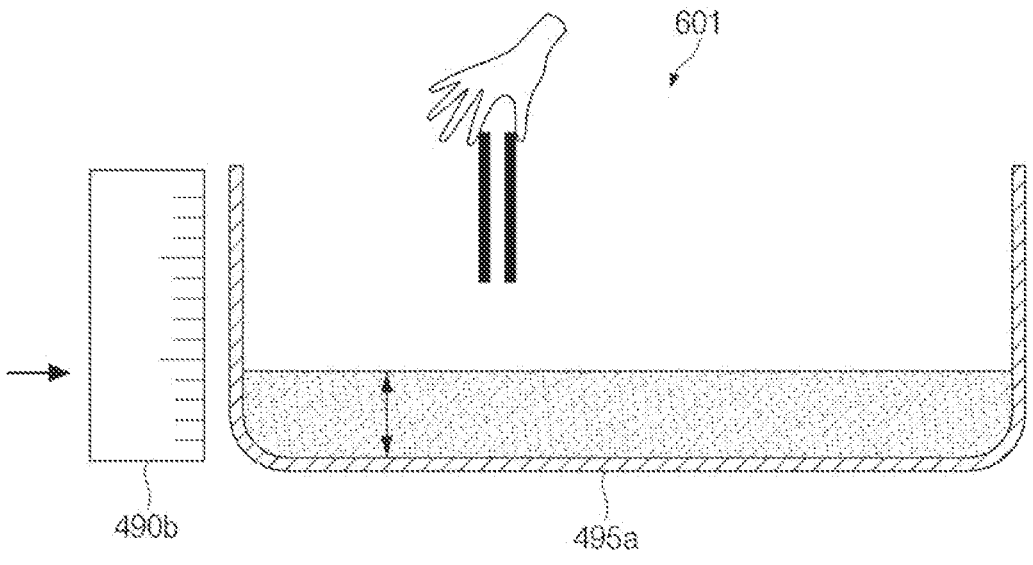
FIG. 6 illustrates an operation of an image sensor by low conversion gain (LCG) and low slope gain (LSG), according to an embodiment.
Figure 6:
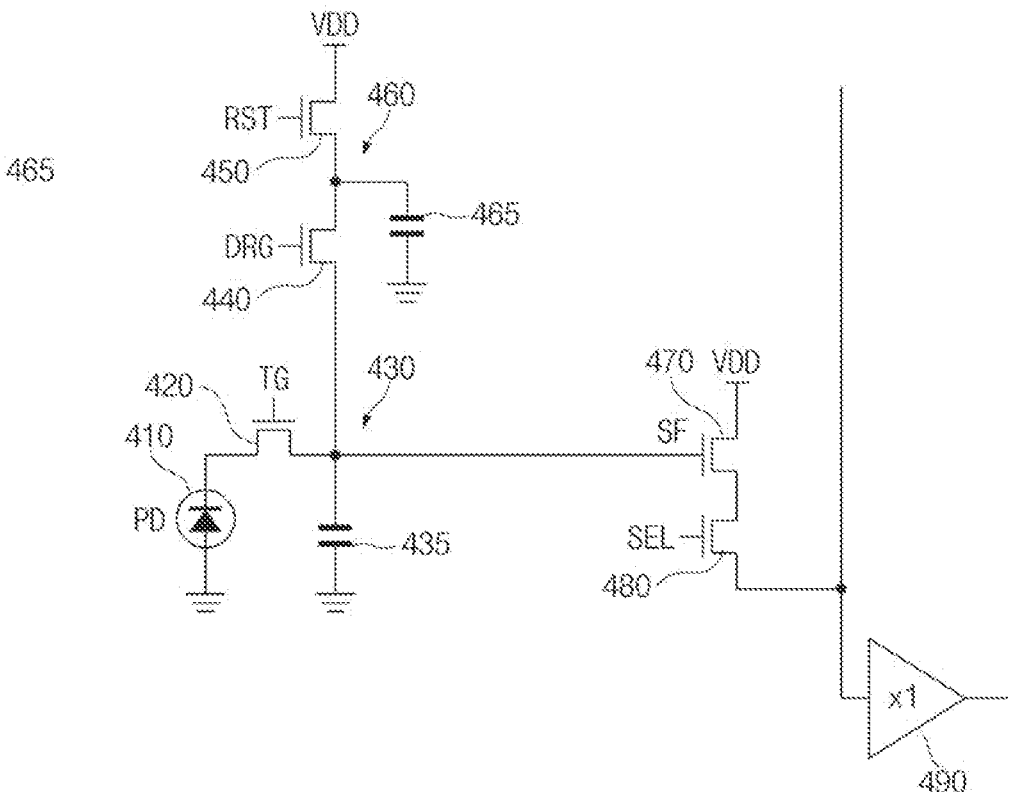

FIG. 6 illustrates an operation of an image sensor by LCG and LSG, according to an embodiment.

Referring to FIG. 6, the PD 410 may generate charges by using light during a specified exposure time. When the TG 420 is activated, charges accumulated in the PD 410 may be charged in the first capacitor 435 connected to the first FD 430. In LCG where the DRG 440 is activated, charges remaining in the PD 410 or charges charged in the first capacitor 435 may move to the second capacitor 465. In a tank model 601, water (corresponding to charges being charged) may be contained in a second tank 495a corresponding to the first capacitor 435 and the second capacitor 465. The second tank 495a may have a larger capacity than the first tank 435a of FIG. 5. Accordingly, when the same amount of water is contained, the second tank 495a may have a lower water level than the first tank 435a of FIG. 5.

According to an embodiment, charges (reset data) remaining after the reset, not charges delivered from the PD 410, may remain in the first capacitor 435 or the second capacitor 465. The reset data may be removed through a separate CDS operation (see FIG. 7).

While the ADC 490 converts second analog data obtained in LCG into second digital data, a saturation voltage may be adjusted (LSG) to correspond to a relatively low second gain (e.g., ×1). In the tank model 601, the second gain of the ADC 490 may correspond to a ruler 490b for measuring a water level in a tank. As the gain decreases, a scale interval of the ruler for measuring the water level may increase. Accordingly, as the scale interval increases, the height of water may be read out as a relatively low value. The second digital data generated through LCG and LSG may be data that is advantageous for reducing saturation in a bright part and representing the bright part.

Figure 7:
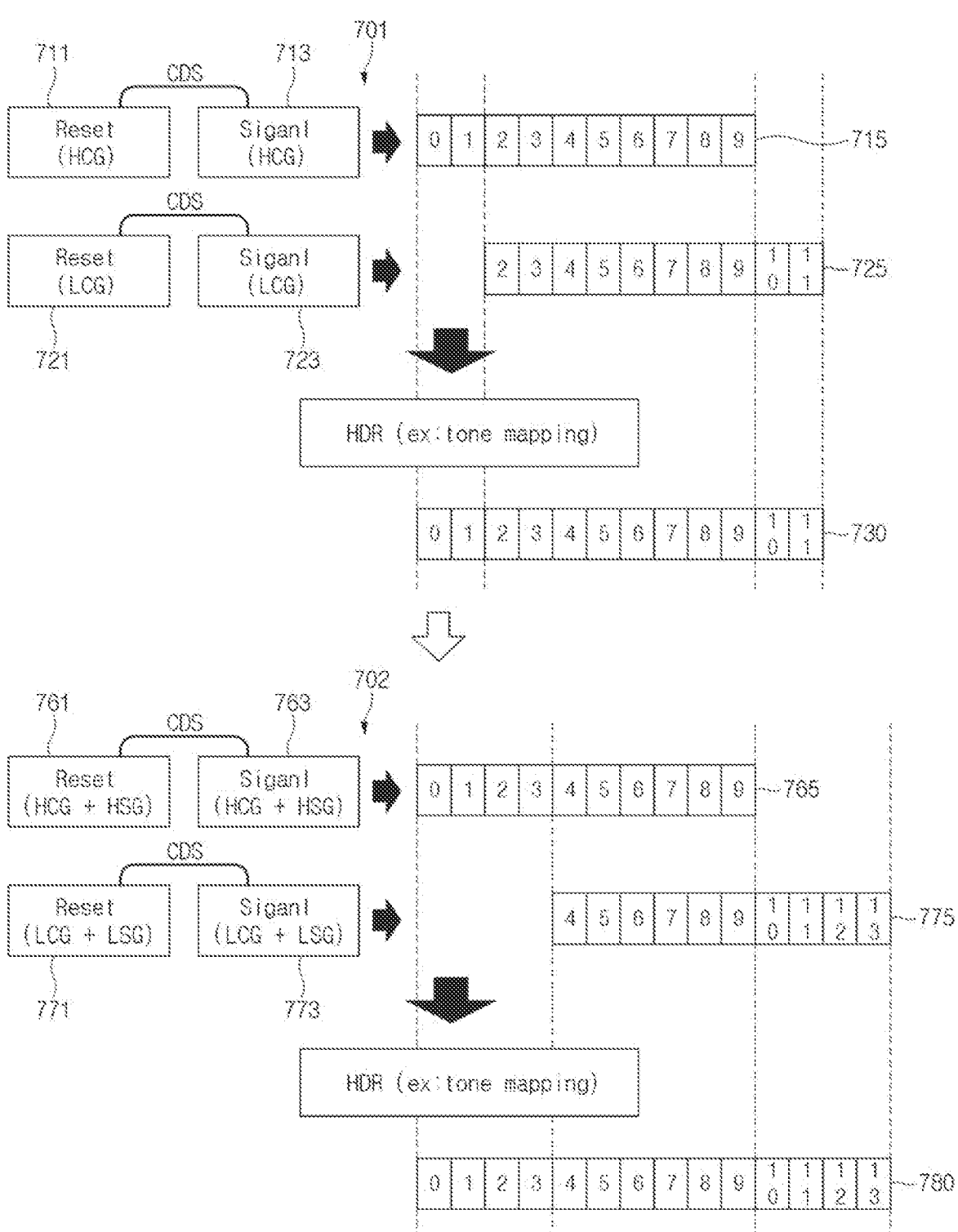
FIG. 7 illustrates generation of a high dynamic range (HDR) image through dynamic range (DR) extension, according to an embodiment.

FIG. 7 illustrates generation of an HDR image through DR extension, according to an embodiment. FIG. 7 is, but is not limited to, only an example.

Referring to FIG. 7, the image sensor 330 may obtain first digital data and second digital data by applying dual conversion gain (DCG) (HCG or LCG) and dual slope gain (DSG) (HSG or LSG) after one exposure. The image sensor 330 may extend DR by using the first digital data and the second digital data and may generate an HDR image.

According to an embodiment, the image sensor 330 may perform a CDS operation to reduce noise. For example, the image sensor 330 may activate the RST 450 and the DRG 440 to reset the first capacitor 435 and the second capacitor 465 to VDD. The image sensor 330 may read out reset data remaining after the reset. The reset data may be data by charges remaining in the first capacitor 435 or the second capacitor 465 in a reset state, not charges charged through the PD 410. The reset data may be stored in a separate CDS circuit. Afterward, the image sensor 330 may inactivate the RST 450 and the DRG 440 and may perform DCG and DSG to obtain first analog data and second analog data based on charges obtained through the PD 410. The image sensor 330 may obtain actual image data by removing (e.g., elimination using a subtractor) the reset data from the first analog data and the second analog data.

According to an embodiment, when DCG is applied and DSG is not applied (701), DR may be expanded depending on a ratio between the capacitance of the first capacitor 435 and the capacitance of the second capacitor 465. For example, the capacitance of the second capacitor may be three times the capacitance of the first capacitor. In this case, a conversion gain between HCG digital data 715 and LCG digital data 725 may be 1:4. A HDR image 730 may be generated by performing tone-mapping on the HCG digital data 715 and the LCG digital data 725.

HCG data 713 may be converted into the HCG digital data 715 of 10 bits. For example, the image sensor 330 may generate the HCG digital data 715 by removing HCG reset data 711 from the HCG data 713. The HCG digital data 715 may be relatively bright data obtained by using charges charged in the first capacitor 435. The HCG digital data 715 may increase saturated pixels in a bright part, but may be advantageous for displaying a dark part.

LCG data 723 may be converted into the LCG digital data 725 of 10 bits. For example, the image sensor 330 may generate the LCG digital data 725 by removing LCG reset data 721 from the LCG data 723. The LCG digital data 725 may be relatively dark data obtained by using charges charged in the first capacitor 435 and the second capacitor 465. Saturated pixels are reduced in the bright part of the LCG digital data 725, which may be advantageous for displaying the bright part.

The image sensor 330 may generate the HDR data 730 having DR extended to 12 bits by combining the HCG digital data 715 and the LCG digital data 725. Dark part data (or lower bits) (a 0-th bit and a first bit) of the HDR data 730 may be based on the HCG digital data 715. Bright part data (or higher bits) (a tenth bit and an eleventh bit) of the HDR data 730 may be based on the LCG digital data 725.

For example, the image sensor 330 may generate the HDR data 730 by performing zero-padding and tone-mapping on the HCG digital data 715 and the LCG digital data 725. The processor 120 may add dummy data (e.g., 00) to the HCG digital data 715 by using most significant bit (MSB) zero-padding, and may add dummy data (e.g., 00) to the LCG digital data 725 by using least significant bit (LSB) zero-padding. Afterward, the processor 120 may generate the HDR data 730 by performing tone-mapping.

When DSG is additionally applied to DCG (multi conversion slope gain (MCSG)) (702), DR may be expanded depending on the gain of the ADC 490 as well as the capacitance ratio between the first capacitor 435 and the second capacitor 465.

In HCG and HSG, first analog data (HCG+HSG) 763 may be converted into first digital data 765 of 10 bits. For example, the image sensor 330 may remove reset data (HCG+HSG) 761 from the first analog data (HCG+HSG) 763 and may generate the first digital data 765 by applying a first gain (×4). The first digital data 765 may be relatively bright data obtained from charges charged in the first capacitor 435. The first digital data 765 may increase saturated pixels in a bright part, but may be advantageous for displaying a dark part.

In LCG and LSG, second analog data (LCG+LSG) 773 may be converted into second digital data 775 of 10 bits. For example, the image sensor 330 may remove reset data (LCG+LSG) 771 from the second analog data 773 and may generate the second digital data 775 by applying a second gain (×1). The second digital data 775 may be relatively dark data obtained from charges charged in the first capacitor 435 and the second capacitor 465. Saturated pixels are reduced in the bright part of the second digital data 775, which may be advantageous for displaying the bright part. The image sensor 330 may generate HDR data 780 having DR extended to 14 bits by combining the first digital data 765 and the second digital data 775. Dark part data (or lower bits) (0-th to third bits) of the HDR data 780 may be based on the first digital data 765. Bright part data (or higher bits) (tenth to thirteenth bits) of the HDR data 780 may be based on the second digital data 775.

For example, the processor 120 may generate the HDR data 780 by performing zero-padding and tone-mapping on the first digital data 765 and the second digital data 775. The processor 120 may add dummy data (e.g., 0000) to the first digital data 765 by using MSB zero-padding, and may add dummy data (e.g., 0000) to the second digital data 775 by using LSB zero-padding. Afterward, the processor 120 may generate the HDR data 780 by performing tone-mapping.

According to an embodiment, the HDR data 730 may be generated by the image processor 340 of FIG. 3 or the processor 120 of FIG. 1 or may be generated in response to a control signal generated by the image processor 340 of FIG. 3 or the processor 120 of FIG. 1.

Figure 8:
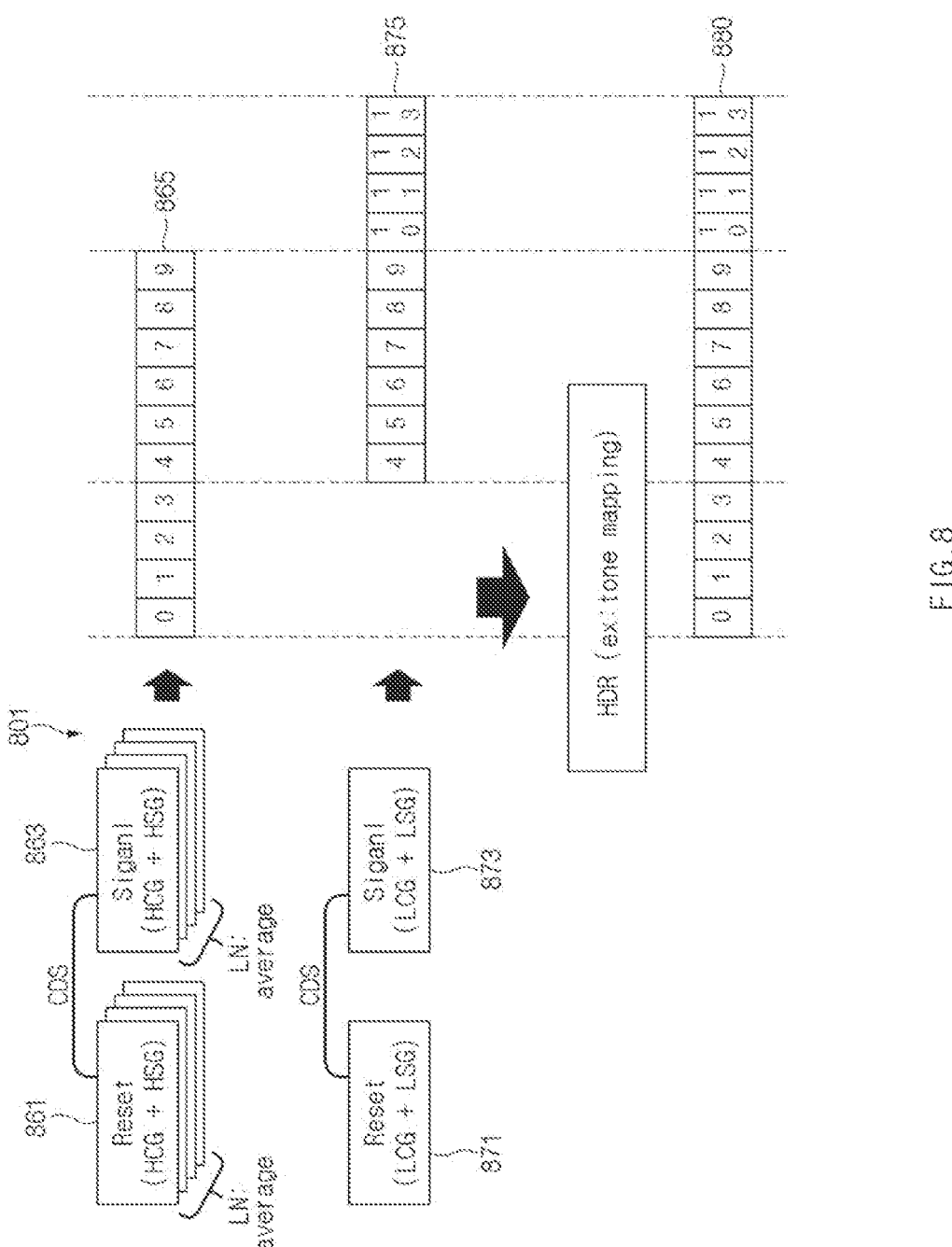
FIG. 8 illustrates a noise reduction mode operation, according to an embodiment.

FIG. 8 illustrates a noise reduction mode operation, according to an embodiment.

Referring to FIG. 8, when DSG is additionally applied to DCG (multi conversion slope gain (MCSG)) (801), the image sensor 330 may reduce noise by operating in a low noise mode (LN mode).

In HCG and HSG, first analog data (HCG+HSG) 863 may be converted into first digital data 865 of 10 bits. For example, the image sensor 330 may remove reset data (HCG+HSG) 861 from the first analog data (HCG+HSG) 863 and may generate the first digital data 865 by applying a first gain (×4).

In HCG and HSG, the image sensor 330 may obtain the first analog data (HCG+HSG) 863 in the low noise mode (LN mode). The image sensor 330 may perform read-out multiple times in HCG and HSG and may calculate the first analog data (HCG+HSG) 863 by averaging the read-out results.

According to an embodiment, the image sensor 330 may obtain the reset data (HCG+HSG) 861 in the LN mode. The image sensor 330 may perform read-out on reset data multiple times in HCG and HSG and may calculate the reset data (HCG+HSG) 861 by averaging the read-out results.

In LCG and LSG, second analog data (LCG+LSG) 873 may be converted into second digital data 875 of 10 bits. For example, the image sensor 330 may remove reset data (LCG+LSG) 871 from the second analog data 873 and may generate the second digital data 875 by applying a second gain (×1). The image sensor 330 may generate HDR data 880 having DR extended to 14 bits by combining the first digital data 865 and the second digital data 875. Dark part data (0-th to third bits) of the HDR data 880 may be based on the first digital data 865. Bright part data (tenth to thirteenth bits) of the HDR data 880 may be based on the second digital data 875.

According to an embodiment, the image sensor 330 may change a method for applying DCG or DSG depending on a shooting environment. For example, in a high-illumination environment where noise deviation is not large, the image sensor 330 may apply HDR of a DSG method. For another example, in a low-illumination environment, the image sensor 330 may operate in the LN mode to reduce read-out noise.

According to an embodiment, an electronic device (101; 301) may include an image sensor (230; 330), a processor (120), and a memory (130). The image sensor (230; 330) may include at least one photo diode (410), a transfer gate (TG) (420) connecting the at least one photo diode (410) to a first node (FD1 node) (430), a first capacitor (435) connected to the first node (430) and having first capacitance, a dynamic range gate (DRG) (440) connected between the first node (430) and a second node (FD2 node) (460), a second capacitor (465) connected to the second node (460) and having second capacitance, a controller that selectively obtains first analog data and second analog data at the first node (430) or the second node (460) by controlling the DRG (440), and an analog-digital converter (ADC) (490) that converts the first analog data and the second analog data into digital data with different gains.

According to an embodiment, the micro controller unit may charge a charge in the at least one photo diode (410) by one exposure, may charge the first capacitor (435) by turning on the TG (420) while the DRG (440) is inactivated, and may obtain the first analog data by reading out a charge charged in the first capacitor (435).

According to an embodiment, the micro controller unit charges the second capacitor (465) by turning on the TG (420) and the DRG (440) after obtaining the first analog data, and obtains the second analog data by reading out a charge charged in the first capacitor (435) and the second capacitor (465).

According to an embodiment, the image sensor (230; 330) may further include a reset switch (450) connected between the second node (460) and a power supply. Before exposing the at least one photo diode (410), the image sensor (230; 330) may activate the reset switch (450) and the DRG (440).

According to an embodiment, the image sensor (230; 330) may store a value of residual charges of the first capacitor (435) or the second capacitor (465) before obtaining the first analog data and the second analog data, and may obtain the first analog data and the second analog data based on the value of the residual charges.

According to an embodiment, the micro controller unit may convert the first analog data into first digital data by applying a first saturation voltage corresponding to a first gain to the ADC (490), and may convert the second analog data into second digital data by applying a second saturation voltage corresponding to a second gain smaller than the first gain to the ADC (490).

According to an embodiment, the first gain may be four times the second gain.

According to an embodiment, the micro controller unit may generate an HDR image by combining the first digital data and the second digital data.

According to an embodiment, the micro controller unit may generate the HDR image by performing zero-padding and tone-mapping on the first digital data and the second digital data.

According to an embodiment, in the HDR image, the micro controller unit may generate dark part data having a first reference value or less based on the first digital data, and may generate bright part data having a reference value, which is greater than or equal to a second reference value greater than the first reference value, based on the second digital data.

According to an embodiment, the HDR image may have 16 times a HDR ratio between the first digital data or the second digital data.

According to an embodiment, the second capacitance may be three times the first capacitance.

According to an embodiment, the ADC (490) may include a plurality of ADCs (490). The plurality of ADCs (490) may operate with different gains from each other.

According to an embodiment, the micro controller unit may read out the first analog data or the second analog data multiple times and may deliver an average value to the ADC (490).

According to an embodiment, the electronic device (101; 301) may further include a sensor module (179). The processor (120) may obtain information related to capturing an image by using the sensor module (179), and may allow the image sensor (230; 330) to obtain the first analog data or the second analog data or to adjust a gain of the ADC (490) based on the information.

According to an embodiment, an electronic device (101; 301) may include a camera module (180), a processor (120), and a memory (130). The camera module (180) may include a lens (210; 310), an image sensor (230; 330), and an image signal processor (260). The image sensor (230; 330) may include at least one photo diode (410), a transfer gate (TG) (420) connecting the at least one photo diode (410) to a first node (FD1 node) (430), a first capacitor (435) connected to the first node (430) and having first capacitance, a DRG (440) connected between the first node (430) and a second node (FD2 node) (460), and a second capacitor (465) connected to the second node (460) and having second capacitance. The image signal processor (260) may selectively obtain first analog data and second analog data at the first node (430) or the second node (460) by controlling the DRG (440), and may convert the first analog data and the second analog data into digital data with different gains.

According to an embodiment, the image signal processor (260) may charge a charge in the at least one photo diode (410) by one exposure, may charge the first capacitor (435) by turning on the TG (420) while the DRG (440) is inactivated, and may obtain the first analog data by reading out a charge charged in the first capacitor (435).

According to an embodiment, the image signal processor (260) charges the second capacitor (465) by turning on the TG (420) and the DRG (440) after obtaining the first analog data, and obtains the second analog data by reading out a charge charged in the first capacitor (435) and the second capacitor (465).

According to an embodiment, the image signal processor (260) may convert the first analog data into first digital data by applying a first saturation voltage corresponding to a first gain, and may convert the second analog data into second digital data by applying a second saturation voltage corresponding to a second gain smaller than the first gain.

According to an embodiment, the image signal processor (260) may generate an HDR image by combining the first digital data and the second digital data.

According to an embodiment, the second capacitance may be three times the first capacitance.

An electronic device according to embodiments disclosed in the specification may generate a HDR image by adjusting the readout of an image sensor. Accordingly, because an HDR image may be generated by one exposure, side effects such as a ghost effect may not occur, unlike an HDR method using a plurality of images at different exposure time points.

According to embodiments disclosed in the specification, the electronic device may increase a HDR effect and may improve a dark part SNR by applying a dual conversion gain (DCG) (HCG and LCG) and a dual slope gain (DSG) (HSG and LSG) in relation to the read-out of an image sensor.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device, comprising:
an image sensor;
a processor; and
a memory,
wherein the image sensor includes:
at least one photo diode;
a transfer gate (TG) connecting the at least one photo diode to a first node;

a first capacitor connected to the first node and having first capacitance;

a dynamic range gate (DRG) connected between the first node and a second node;

a second capacitor connected to the second node and having second capacitance;

an analog-digital converter (ADC); and a micro controller unit configured to:

obtain first analog data at the first node, by deactivating the DRG, convert the first analog data into first digital data by applying a first gain in the ADC, obtain second analog data at the first node and the second node, by activating the DRG, and convert the second analog data into second digital data by applying a second gain smaller than the first gain in the ADC, and wherein the processor is configured to:

generate dark part data having a value equal to or less than a first reference value, based on the first digital data, generate bright part data having a value greater than or equal to a second reference value that is greater than the first reference value, based on the second digital data, and generate a high dynamic range (HDR) image based on the generated dark part data and the generated bright part data.

2. The electronic device of claim 1, wherein the micro controller unit is further configured to:

charge the at least one photo diode by performing a single exposure, charge the first capacitor by activating the TG and deactivating the DRG, and obtain the first analog data by reading out the charge in the first capacitor.

3. The electronic device of claim 2, wherein the micro controller unit is further configured to:

charge the second capacitor by activating the TG and activating the DRG, after obtaining the first analog data, and obtain the second analog data by reading out the charge in the first capacitor and the charge in the second capacitor.

4. The electronic device of claim 2, wherein the image sensor further comprises a reset switch connected between the second node and a power supply, and wherein the micro controller unit is further configured to activate the reset switch and activate the DRG, before performing the single exposure, to determine a value of residual charges based on at least one of the first capacitor or the second capacitor.

5. The electronic device of claim 4, wherein the micro controller unit is further configured to:

store the value of the residual charges, before obtaining the first analog data and the second analog data, and obtain the first analog data and the second analog data based on the value of the residual charges.

6. The electronic device of claim 1, wherein the first gain is four times greater than the second gain.

7. The electronic device of claim 1, wherein the processor is further configured to generate the HDR image by performing zero-padding and tone-mapping on the first digital data and the second digital data.

8. The electronic device of claim 1, wherein the HDR image has 16 times an HDR ratio between the first digital data and the second digital data.

9. The electronic device of claim 1, wherein the second capacitance is three times greater than the first capacitance.

10. The electronic device of claim 1, wherein the ADC comprises a first ADC configured to convert the first analog data into the first digital data by applying the first gain and a second ADC configured to convert the second analog data into the second digital data by applying the second gain.

11. The electronic device of claim 1, wherein the micro controller unit is further configured to:

obtain the first digital data by providing an average of multiple readings of a charge in the first capacitor, to the ADC, and obtain the second digital data by providing an average of multiple readings of the charge in the first capacitor and a charge in the second capacitor, to the ADC.

12. An electronic device, comprising:

a camera module;

a processor; and a memory, wherein the camera module includes:

a lens;

an image sensor; and an image signal processor, wherein the image sensor includes:

at least one photo diode;

a transfer gate (TG) connecting the at least one photo diode to a first node;

a first capacitor connected to the first node and having first capacitance;

a dynamic range gate (DRG) connected between the first node and a second node;

a second capacitor connected to the second node and having second capacitance; and an analog-digital converter (ADC), and wherein the image signal processor is configured to:

obtain first analog data at the first node, by deactivating the DRG, convert the first analog data into first digital data by applying a first gain in the ADC, obtain second analog data at the first node and the second node, by activating the DRG, convert the second analog data into second digital data by applying a second gain smaller than the first gain in the ADC, generate dark part data having a value equal to or less than a first reference value, based on the first digital data, generate bright part data having a value greater than or equal to a second reference value that is greater than the first reference value, based on the second digital data, and generate a high dynamic range (HDR) image based on the generated dark part data and the generated bright part data.

13. The electronic device of claim 12, wherein the image signal processor is further configured to:

charge the at least one photo diode by performing a single exposure, charge the first capacitor by activating the TG and deactivating the DRG, and obtain the first analog data by reading out the charge in the first capacitor.

14. The electronic device of claim 13, wherein the image signal processor is further configured to:

charge the second capacitor by activating the TG and activating the DRG, after obtaining the first analog data, and obtain the second analog data by reading out the charge in the first capacitor and the charge in the second capacitor.

15. The electronic device of claim 12, further comprising:

a sensor module configured to generate a signal corresponding to a state of an environment or a user, wherein the image signal processor is further configured to:

obtain sensor information related to capturing an image, based on the sensor module, adjust at least one of the first gain or the second gain, based on the sensor information, and generate the HDR image by converting at least one of the first analog data or the second analog data, based on the adjusted at least one of the first gain or the second gain.

* * * * *